(12) United States Patent
Greenwood et al.

(10) Patent No.: US 7,153,067 B2
(45) Date of Patent: Dec. 26, 2006

(54) ROTARY CUTTING TOOL HAVING MULTIPLE HELICAL CUTTING EDGES WITH DIFFERING HELIX ANGLES

(76) Inventors: Mark L. Greenwood, 875 Rae Dr., Hartland, WI (US) 53029; Kevin Cranker, W366 S4385 Hwy 67, Dousman, WI (US) 53118

(*) Notice: Subject to any disclaimer, the term of this patent is extended or adjusted under 35 U.S.C. 154(b) by 53 days.

(21) Appl. No.: 11/110,320

(22) Filed: Apr. 20, 2005

(65) Prior Publication Data

US 2006/0188346 A1   Aug. 24, 2006

Related U.S. Application Data

(60) Provisional application No. 60/654,541, filed on Feb. 18, 2005.

(51) Int. Cl.
*B23C 5/10*   (2006.01)
(52) U.S. Cl. ............................. 407/53; 407/60
(58) Field of Classification Search ................. 407/53, 407/54, 34, 56, 60; 408/230, 227
See application file for complete search history.

(56) References Cited

U.S. PATENT DOCUMENTS

| | | | |
|---|---|---|---|
| 1,963,611 A | 6/1934 | Brumell et al. | |
| 2,782,490 A | 2/1957 | Graves | |
| 3,726,351 A | 4/1973 | Williams, Jr. | |
| 4,149,821 A | 4/1979 | Faber | |
| 4,212,568 A * | 7/1980 | Minicozzi | 407/53 |
| 4,230,429 A | 10/1980 | Eckle | |
| 5,049,011 A | 9/1991 | Bohnet et al. | |
| D328,557 S | 8/1992 | Nishimura | |
| 5,302,059 A | 4/1994 | Fabiano | |
| 5,323,823 A * | 6/1994 | Kopras | 144/219 |
| 5,779,399 A | 7/1998 | Kuberski | |
| 5,947,659 A | 9/1999 | Mays | |
| D430,584 S | 9/2000 | Kouvelis | |
| D445,436 S | 7/2001 | George | |
| 6,652,203 B1 | 11/2003 | Risen, Jr. | |
| 6,698,981 B1 | 3/2004 | Beno | |
| 2002/0090273 A1 | 7/2002 | Serwa | |
| 2003/0118411 A1 | 6/2003 | Flynn et al. | |
| 2003/0185640 A1 | 10/2003 | Ito | |
| 2004/0057803 A1 | 3/2004 | Walrath | |
| 2004/0120777 A1 | 6/2004 | Noland | |
| 2004/0258490 A1 | 12/2004 | Walrath | |

* cited by examiner

*Primary Examiner*—Daniel W. Howell
*Assistant Examiner*—Sara Addisu
(74) *Attorney, Agent, or Firm*—Eric Karich

(57) ABSTRACT

A rotary cutting tool is disclosed including a substantially cylindrical main body having a shank portion at one end and a point at an opposite end. Five flutes are formed in an outer surface of the main body. Each of the flutes extends continuously from the point to the shank portion, and defines a helical cutting edge having a helix angle between about 32 degrees and approximately 34 degrees with respect to an axis of the main body. At least 2 of the flutes define helical cutting edges having different helix angles.

3 Claims, 1 Drawing Sheet

ROTARY CUTTING TOOL HAVING MULTIPLE HELICAL CUTTING EDGES WITH DIFFERING HELIX ANGLES

CROSS-REFERENCE TO RELATED APPLICATIONS

This application for a utility patent claims the benefit of U.S. Provisional Application No. 60/654,541, filed Feb. 18, 2005.

STATEMENT REGARDING FEDERALLY SPONSORED RESEARCH

Not Applicable

BACKGROUND OF THE INVENTION

1. Field of the Invention

This invention relates generally to rotary cutting tools and end mills, and more particularly to helically fluted end mills having variable helical angles for improved performance characteristics.

2. Description of Related Art

Rotary cutting tools are used for various machining operations on workpieces. An end mill cutter or "end mill" is a type of rotary cutting tool. Machine operations often carried out using an end mill cutter include the forming of slots, keyways, and pockets. During typical use of an end mill cutter, a milling machine rotatably drives the end mill cutter about its longitudinal axis, and various cutting edges of the end mill cutter are used to remove material from a workpiece.

Over time, the cutting edges of an end mill cutter become dull due to physical contact between the end mill cutter and workpieces. As the cutting edges become dull, internal stresses generated within the end mill cutter during use increase. Harmonic vibrations constitute major sources of internal stresses in end mill cutters. It is common for end mill cutters to break during use due to the internal stresses. One way of extending the operation life of a end mill cutter is to reduce the amplitudes of harmonic vibrations generated within the tool during use.

It would thus be beneficial to have an end mill cutter wherein amplitudes of harmonic vibrations generated within the tool during use are reduced. The operational life of such an end mill cutter would expectedly be extended significantly.

The state of the art includes the following:

Flynn, et al, U.S. 2003/0118411 A1, teaches an end mill that include a flute having a helix which varies along the length of the tool. The end mill may include varying numbers of flutes, whether odd or even; helix change(s) within a flute or between flutes; or indexing between cutting edges or flutes. A 'slow' or 'high' helix may be used at the end or starting point of the tool, depending upon the application. A slow helix at the end or starting point is desirable for a strong corner in ramping and plunging into the material. When a higher helix is used at the end transitioning to a smaller helix at the shank, the corner is also protected because of the helix change. The high helix at the tip may be needed for shearing action in a given material.

Risen, Jr., U.S. Pat. No. 6,652,203 B1, teaches a precision drill bit that includes at least one cutting flute extends along the length of the bit and exhibits a helix angle of about 38.degree. at the tip. The helix angle decreases to an angle of about 15.degree. at the end of the flute run-out. The helix angle changes progressively and substantially linearly over a number of segments along the length of the drill bit.

Ito, U.S. 2003/0185640 A1, teaches a dual rake twist drill bit for drilling holes in articles made of abrasive materials (fiberglass-filled printed circuit boards, which relatively quickly dull bits). The bit includes spiraled flutes with cutting lips and inclined to the axis of the bit at a relatively small helix angle or rake in the range of about 3 degrees to 10 degrees. A longer rear portion which the flutes and cutting lips have a larger rake of about 33 degrees. The dual rake bit has substantially greater wear resistance than single rake bits. In a modification of the dual rake bit, the central web portion has a front longitudinal portion which is relatively acutely tapered, and a rear portion which is relatively modestly tapered, the dual tapered construction increasing resistance of the bit to breaking.

Noland, U.S. 2004/0120777 A1, teaches a rotary cutting tool that includes a plurality of axial flutes extends from an end surface to a fluted cutting end and combines with a plurality of cutting edges. The cutting edges are unequally spaced along the circumference of the end surface lying in a plane perpendicular to the longitudinal axis of rotation. In addition, all cutting edges are of a different helix from one another and the cutting edge geometries vary from one another to create a different sound pattern that reduces resonant harmonic vibrations.

Walrath, U.S. 2004/0057803 A1 and U.S. 2004/0258490, teach a rotary end-mill having a deferential flute construction with all individual flutes being unequally spaced about the circumference of the cylindrical tool body at different helix angles. The cutting edge of these flutes also face in the direction of tool rotation.

Other references of interest include the following: C. O. Graves, U.S. Pat. No. 2,782,490; H. P. Brumell, et al, U.S. Pat. No. 1,963,611; Kuberski, U.S. Pat. No. 5,779,399; George, U.S. D445,436 S; Kouvelis, U.S. Des. 430,584 and Nishimura, U.S. Des. 328,557.

All of the above-described references are hereby incorporated by reference in full.

SUMMARY OF THE INVENTION

A rotary cutting tool is disclosed including a substantially cylindrical main body having a shank portion at one end and a point at an opposite end. Five flutes are formed in an outer surface of the main body. Each of the flutes extends continuously from the point to the shank portion, and defines a helical cutting edge having a helix angle between about 32 degrees and approximately 34 degrees with respect to an axis of the main body. At least 2 of the flutes define helical cutting edges having different helix angles.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
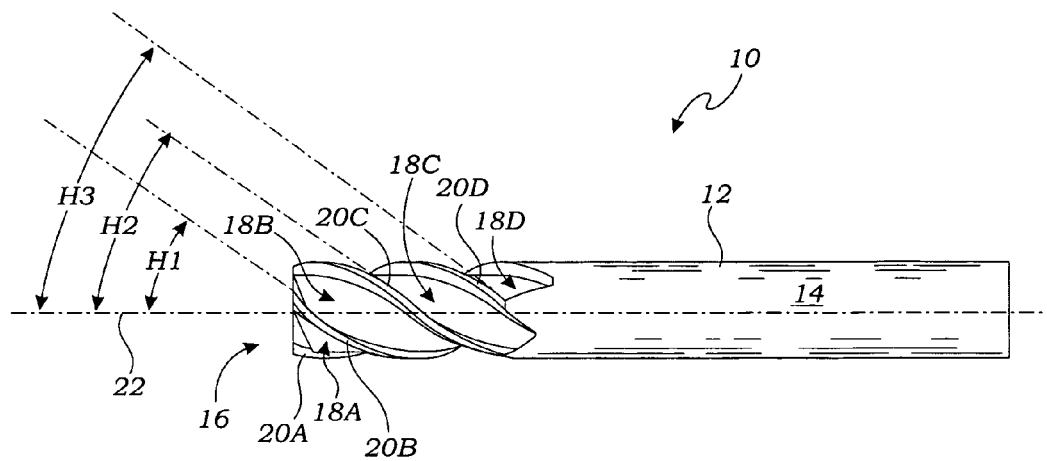
FIG. 1 is a side elevation view of one embodiment of a rotary cutting tool including a substantially cylindrical main body having a point at one end.

FIG. 1 is a side elevation view of one embodiment of a rotary cutting tool 10 including a substantially cylindrical main body 12 having a shank portion 14 at one end and a point 16 at an opposite end. In the embodiment of FIG. 1, the rotary cutting tool 10 is an end milling cutter or "end mill," and has 5 flutes formed in an outer surface of the main body 12. Each of the 5 flutes extends continuously from the point 16 to the shank portion 14, and defines a helical cutting edge about an outer surface of the main body 12. The rotary cutting tool 10 thus has 5 helical cutting edges about the outer surface of the main body 12.

Four of the 5 flutes of the rotary cutting tool 10 are visible in FIG. 1 and labeled 18A–18D. The flute 18A defines a helical cutting edge 20A about the outer surface of the main body 12. The flute 18B defines a helical cutting edge 20B about the outer surface of the main body 12. Similarly, the flute 18C defines a helical cutting edge 20C about the outer surface of the main body 12, and the flute 18D defines a helical cutting edge 20D about the outer surface of the main body 12. Herein below, the 5 helical cutting edges will be referred collectively to as "the helical cutting edges 20."

Each of the helical cutting edges 20 has a helix angle with respect to an axis 22 of the substantially cylindrical main body 12 and a tangent line of the helical cutting edges 20. In general, the helix angles of the helical cutting edges 20 are between about 32 degrees and approximately 34 degrees with respect to the axis 22, and at least 2 of the helical cutting edges 20 have different helix angles. For example, in one embodiment, the helix angle of a first of the helical cutting edges 20 is about 34 degrees, the helix angle of a second of the helical cutting edges 20 adjacent the first is approximately 33 degrees, the helix angle of a third of the helical cutting edges 20 adjacent the second is about 32 degrees, the helix angle of a fourth of the helical cutting edges 20 adjacent the third is approximately 33 degrees, and the helix angle of the fifth of the helical cutting edges 20 adjacent the fourth is about 34 degrees.

For purposes of this application, the term "about X degrees" shall be defined to mean X+/−0.5 degrees. In the most preferred embodiment, these terms shall include X+/−0.3 degrees.

While the preferred embodiment includes flutes that have a constant helical angles along the length of the flute, in some embodiments this angle may be varied along the length of the flute. To the extent that such variation is made by one skilled in the art to significantly copy the above-described geometries and without impeding the performance of the tool, such variation should be considered equivalent to the embodiment described and within the scope of the invention, as claimed.

Varying the helix angles of helical cutting edges 20 has been found to substantially extend the operational life of the rotary cutting tool 10. It is believed that these helix angles serve to reduce amplitudes of harmonic vibrations generated within the rotary cutting tool 10 during use, thereby substantially extending the operational life of the rotary cutting tool 10.

As indicated in FIG. 1, the helical cutting edge 20B has a helix angle "H1" with respect to an axis 22 of the substantially cylindrical main body 12. The helical cutting edge 20C has a helix angle "H2" with respect to the axis 22, and the helical cutting edge 20D has a helix angle "H3" with respect to the axis 22. In the embodiment described above, and where the helical cutting edge 20B is the first of the helical cutting edges 20, the helix angle H1 is about 34 degrees, the helix angle H2 is approximately 33 degrees, and the helix angle H3 is about 32 degrees.

Figure 2:
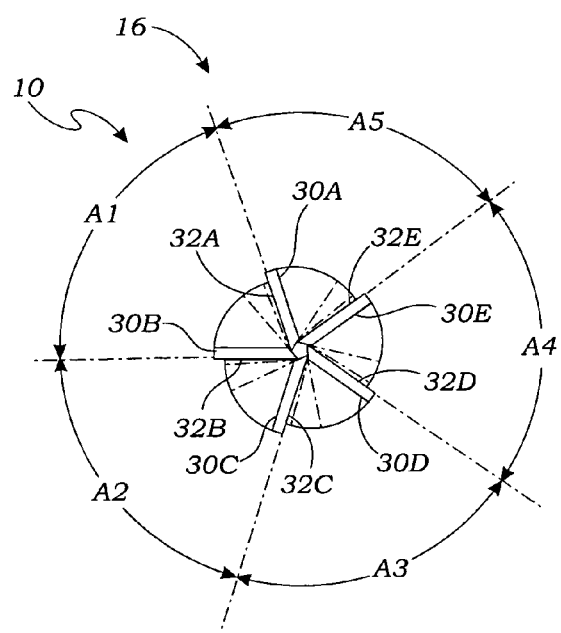
FIG. 2 is an end view of the rotary cutting tool of FIG. 1 illustrating features of the point of the main body.

FIG. 2 is an end view of the rotary cutting tool 10 of FIG. 1 illustrating features of the point 16 of the main body 12. As shown in FIG. 2, the rotary cutting tool 10 has 5 flat cutting edges at the point 16. Each of the 5 flutes of the rotary cutting tool 10 extends continuously from a different one of the 5 flat cutting edges to the shank portion 14 of the main body 12.

In FIG. 2, the 5 flat cutting edges are labeled 30A–30E, and have corresponding leading edges 32A–32E. In general, the flat cutting edges 30A–30E are arranged about the point 16 such that an angle between about 70 degrees and approximately 74 degrees exists between a leading edge of one of the flat cutting edges 30A–30E and a leading edge of an adjacent one of the flat cutting edges 30A–30E.

In one embodiment, at least two different angles exist between the leading edges 32A–32E of adjacent ones of the flat cutting edges 30A–30E. More specifically, a first angle exists between the leading edge of a first one of the flat cutting edges 30A–30E and an adjacent second one of the flat cutting edges 30A–30E, and a second angle exists between the leading edge of the second one of the flat cutting edges 30A–30E and an adjacent third one of the flat cutting edges 30A–30E, wherein the first angle and the second angle are different.

In FIG. 2, an angle "A1" exists between the leading edge 32A of the flat cutting edge 30A and the leading edge 32B of the adjacent flat cutting edge 30B. An angle "A2" exists between the leading edge 32B of the flat cutting edge 30B and the leading edge 32C of the adjacent flat cutting edge 30C, and an angle "A3" exists between the leading edge 32C of the flat cutting edge 30C and the leading edge 32D of the adjacent flat cutting edge 30D. An angle "A4" exists between the leading edge 32D of the flat cutting edge 30D and the leading edge 32E of the adjacent flat cutting edge 30E, and an angle "A5" exists between the leading edge 32E of the flat cutting edge 30E and the leading edge 32A of the adjacent flat cutting edge 30A. In one particular embodiment, the angle A1 is about 73 degrees, the angle A2 is approximately 70 degrees, the angle A3 is about 74 degrees, the angle A4 is approximately 72 degrees, and the angle A5 is about 71 degrees.

The rotary cutting tool 10 of FIGS. 1–2 is preferably made from at least one metal. Suitable metals and metal alloys include steel (including high speed steel and stainless steel), cast iron, carbide (an alloy including cobalt and tungsten), and titanium. A portion of the rotary cutting tool 10 including the 5 flat cutting edges 30A–30E, and the 5 helical cutting edges (including the helical cutting edges 20A–20D), is preferably coated with a wear reducing material. Suitable wear reducing materials include titanium nitride (TiN), titanium aluminum nitride (TiAlN), titanium carbonitride (TiCN), zirconium nitride (ZrN), and aluminum titanium nitride (AlTiN).

Four separate tests were conducted over a 4-month period to compare the operational effectiveness of the rotary cutting tool 10 of FIGS. 1–2 to other commonly used and commercially available end mill cutters. In each of these tests, the operational life of the rotary cutting tool 10 exceeded the operational lives of the other end mill cutters. It is believed that the helix angles used in the rotary cutting tool 10 and described above reduced amplitudes of harmonic vibrations generated within the rotary cutting tool 10 during use, thereby substantially extending the operational life of the rotary cutting tool 10. In each test, the greater operational life of the rotary cutting tool 10 represented a significant savings in both operating time and operating cost.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A rotary cutting tool, comprising:
   a substantially cylindrical main body having a shank portion at one end and a point at an opposite end;
   5 flutes formed in an outer surface of the main body, each of the flutes extending continuously from the point to the shank portion and defining a helical cutting edge having a helix angle of 34, 33, 32, 33, and 34 degrees, respectively, +/−0.3 degrees.

2. The rotary cutting tool as recited in claim 1, wherein a first angle exists between the leading edge of a first one of the flat cutting edges and an adjacent second one of the flat cutting edges, and wherein a second angle exists between the leading edge of the second one of the flat cutting edges and an adjacent third one of the flat cutting edges, and wherein the first angle and the second angle are different.

3. The rotary cutting tool as recited in claim 2, wherein the first angle is about 70 degrees, and the second angle is about 73 degrees.

* * * * *